US012544774B2

(12) United States Patent
Wang et al.

(10) Patent No.: US 12,544,774 B2
(45) Date of Patent: Feb. 10, 2026

(54) WATER STOPPING MECHANISM CONFIGURED FOR WATER OUTLET DEVICE AND WATER OUTLET DEVICE

(71) Applicant: Xiamen Lota International Co., Ltd., Fujian (CN)

(72) Inventors: Xuedong Wang, Fujian (CN); Jinyong Chen, Fujian (CN); Yingan Li, Fujian (CN); Chuanbao Zhu, Fujian (CN)

(73) Assignee: Xiamen Lota International Co., Ltd., Xiamen (CN)

( * ) Notice: Subject to any disclaimer, the term of this patent is extended or adjusted under 35 U.S.C. 154(b) by 432 days.

(21) Appl. No.: 18/070,542

(22) Filed: Nov. 29, 2022

(65) Prior Publication Data

US 2024/0091795 A1 Mar. 21, 2024

(30) Foreign Application Priority Data

Sep. 15, 2022 (CN) ........................ 202211130350.0

(51) Int. Cl.
*B05B 1/16* (2006.01)
*B05B 1/18* (2006.01)

(52) U.S. Cl.
CPC ................ *B05B 1/16* (2013.01); *B05B 1/185* (2013.01)

(58) Field of Classification Search
CPC .. B05B 1/16; B05B 1/185; B05B 3/16; B05B 11/007; B05B 1/3006; B05B 1/323; B05B 1/36; B05B 15/528; E03C 1/0408; E03C 2001/026
USPC ........................................................ 239/562
See application file for complete search history.

(56) References Cited

U.S. PATENT DOCUMENTS 5,246,301 A * 9/1993 Hirasawa ............. A46B 11/063 401/289
6,382,531 B1 * 5/2002 Tracy .................... B05B 1/1824 239/533.13
10,821,453 B2 * 11/2020 Armbruster ............. B05B 1/185

FOREIGN PATENT DOCUMENTS

| | | | |
|---|---|---|---|
| CN | 103240199 | A | 8/2013 |
| DE | 102018121773 | A1 | 3/2020 |
| EP | 3276231 | A1 | 1/2018 |
| EP | 3623054 | A1 | 3/2020 |

(Continued)

OTHER PUBLICATIONS

EP Search Report cited in EP22211494.4, mailed Aug. 21, 2023, 3 pages.

(Continued)

*Primary Examiner* — Christopher R Dandridge
(74) *Attorney, Agent, or Firm* — Cooper Legal Group, LLC

(57) ABSTRACT

A water stopping mechanism configured for a water outlet device comprises one or more pad members configured for elastic deformation. The one or more pad members are configured to be movably disposed in a water outlet chamber of the water outlet device. The one or more pad members at least define a position-providing space, and the one or more pad members comprise a water stopping position and an open position. When in the water stopping position, the one or more pad members elastically hermetically seal and abut an outer peripheral of one or more water outlet ports of the water outlet chamber to achieve water stopping and hermetical sealing, and the one or more pad members are configured to move toward the position-providing space due to increasing of water pressure in the water outlet chamber to terminate the water stopping and the hermetical sealing.

17 Claims, 8 Drawing Sheets

(56) References Cited

FOREIGN PATENT DOCUMENTS

WO 2016203270 A1 12/2016
WO WO-2021037421 A1 * 3/2021 ........... E03C 1/0408

OTHER PUBLICATIONS

EP Office Action cited in EP22211494.4, mailed Sep. 5, 2023, 6 pages.

* cited by examiner

WATER STOPPING MECHANISM CONFIGURED FOR WATER OUTLET DEVICE AND WATER OUTLET DEVICE

RELATED APPLICATIONS

This application claims priority to Chinese patent application number 202211130350.0, filed on Sep. 15, 2022. Chinese patent application number 202211130350.0 is incorporated herein by reference.

FIELD OF THE DISCLOSURE

The present disclosure relates to a water stopping mechanism configured for a water outlet device and the water outlet device.

BACKGROUND OF THE DISCLOSURE

Take a shower rod as an example of a water outlet device in a family home now. An upper part of the shower rod is equipped with an overhead shower. After water is shut off by a water mixing valve, dripping water will continue for a long time due to water accumulation in a cavity of the conventional overhead shower. At night or in other quieter situations, a noise generated by water droplets will affect the quality of life, and if someone passes through the shower room, it is easy to slip and cause damage.

BRIEF SUMMARY OF THE DISCLOSURE

The present disclosure provides a water stopping mechanism configured for a water outlet device and the water outlet device to solve the deficiencies in the background.

In order to solve the technical problem, a first technical solution of the present disclosure is as follows.

A water stopping mechanism configured for a water outlet device comprises one or more pad members configured for elastic deformation. The one or more pad members are configured to be movably disposed in a water outlet chamber of the water outlet device. The one or more pad members at least define a position-providing space, and the one or more pad members comprise a water stopping position and an open position. When in the water stopping position, the one or more pad members elastically hermetically seal and abut an outer peripheral of one or more water outlet ports of the water outlet chamber to achieve water stopping and hermetical sealing, and the one or more pad members are configured to move toward the position-providing space due to increasing of water pressure in the water outlet chamber to terminate the water stopping and the hermetical sealing so as to move from the water stopping position to the open position, and the one or more pad members elastically deform to accumulate an elastic force.

In a preferred embodiment, the water stopping mechanism further comprises one or more ventilation holes, and the one or more ventilation holes are in communication with the position-providing space and outside air. When the one or more pad members move toward the position-providing space, the one or more ventilation holes are configured to maintain an air pressure balance between the position-providing space and the outside air.

In a preferred embodiment, the one or more ventilation holes are in communication with the one or more water outlet ports.

In a preferred embodiment, the one or more pad members comprise a pad body and a deformation member which are integrated to each other, and the deformation member is configured for elastic deformation. The pad body is configured to hermetically seal and abut the outer peripheral of the one or more water outlet ports, and the deformation member is configured to apply the elastic force to the pad body toward the one or more water outlet ports.

In a preferred embodiment, a periphery of the pad body is enclosed by the deformation member. A first side of the pad body, the water outlet chamber, and the deformation member define the position-providing space, and a second side of the pad body is configured to hermetically seal and abut the outer peripheral of the one or more water outlet ports.

In a preferred embodiment, the outer peripheral of the one or more water outlet ports comprises an annular surrounding wall, and the pad body is configured to hermetically seal and abut an upper side of the annular surrounding wall.

In a preferred embodiment, the one or more pad members are a plurality of pad members, and the plurality of pad members respectively correspond to a plurality of water outlet ports of the one or more water outlet ports.

In a preferred embodiment, the water stopping mechanism further comprises a connecting member is connected to and disposed between the plurality of pad members, and the connecting member is configured to be connected to the water outlet device.

In a preferred embodiment, the one or more pad members comprise a connecting block, and the deformation member is connected to and disposed between the pad body and the connecting block. The connecting block is configured to be fixedly connected to the water outlet device.

The present disclosure further provides a water outlet device comprising the water stopping mechanism configured for the water outlet device.

Compared with the existing techniques, the technical solution has the following advantages.

1. When in the water stopping position, the water outlet chamber is not supplied with water, and the one or more pad members elastically hermetically seal and abut the outer peripheral of the one or more water outlet ports to achieve the water stopping and the hermetical sealing. When the water outlet chamber is supplied with the water, the one or more pad members are driven by the water pressure to move toward the position-providing space. At this time, the water stopping and the hermetical sealing is terminated to enable the one or more pad members to move from the water stopping position to the open position. At this time, the one or more pad members elastically deform to accumulate the elastic force. When the supply of water to the water outlet chamber is stopped, the one or more pad members hermetically seal and abut the outer peripheral of one or more water outlet ports again due to spring-back of the elastic force accumulated in the one or more pad members. The one or more pad members are configured for automatic feedback according to a change of the water pressure so as to close the one or more water outlet ports to prevent the water from leaking when the supply of the water is stopped.

2. The water stopping mechanism further comprises one or more ventilation holes, and the one or more ventilation holes are in communication with the position-providing space and outside air. When the one or more pad members move toward the position-providing space, the one or more ventilation holes are configured to maintain an air pressure balance between the position-providing space and the outside air to avoid the one or more pad members having moving difficulty due to an excessive air pressure generated in the position-providing space.

DETAILED DESCRIPTION OF THE EMBODIMENTS

Figure 1:
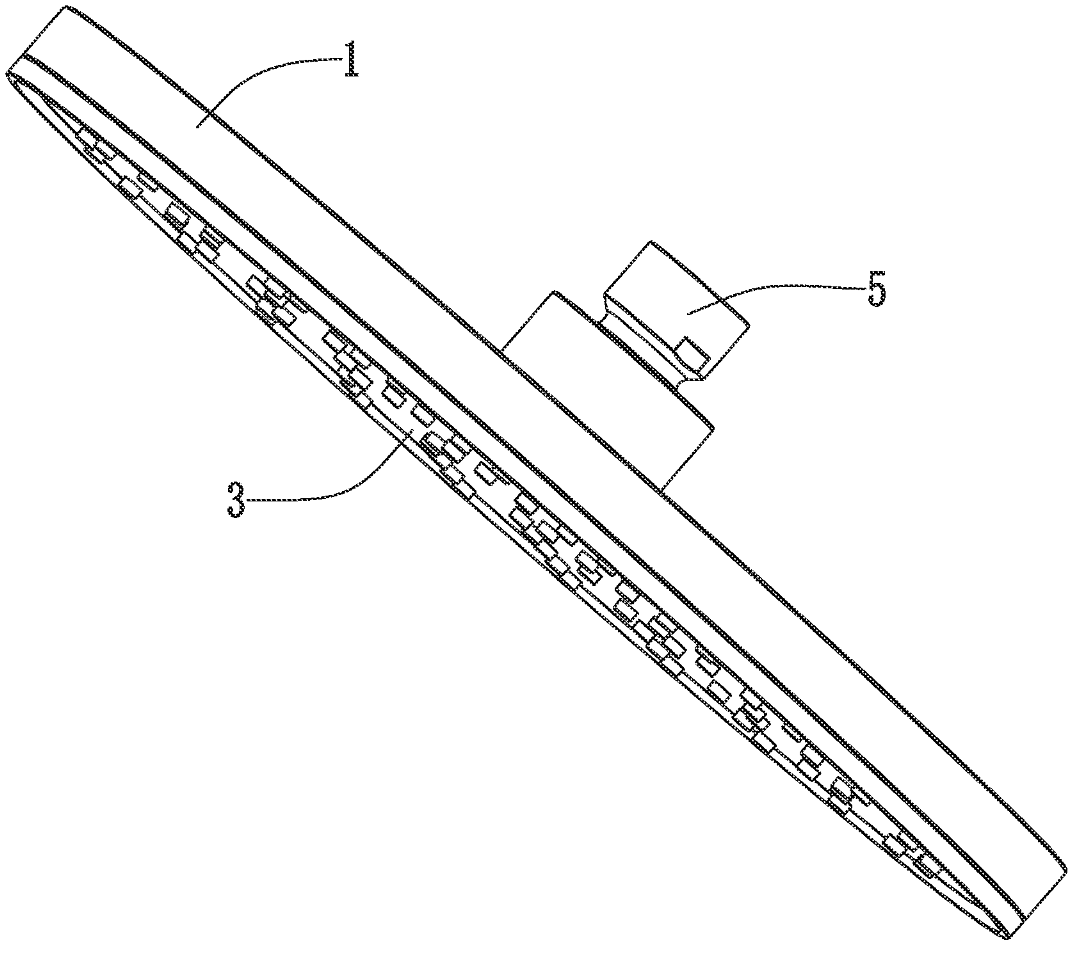
FIG. 1 illustrates a perspective view of a water outlet device in a preferred embodiment in the present disclosure.
Figure 2:
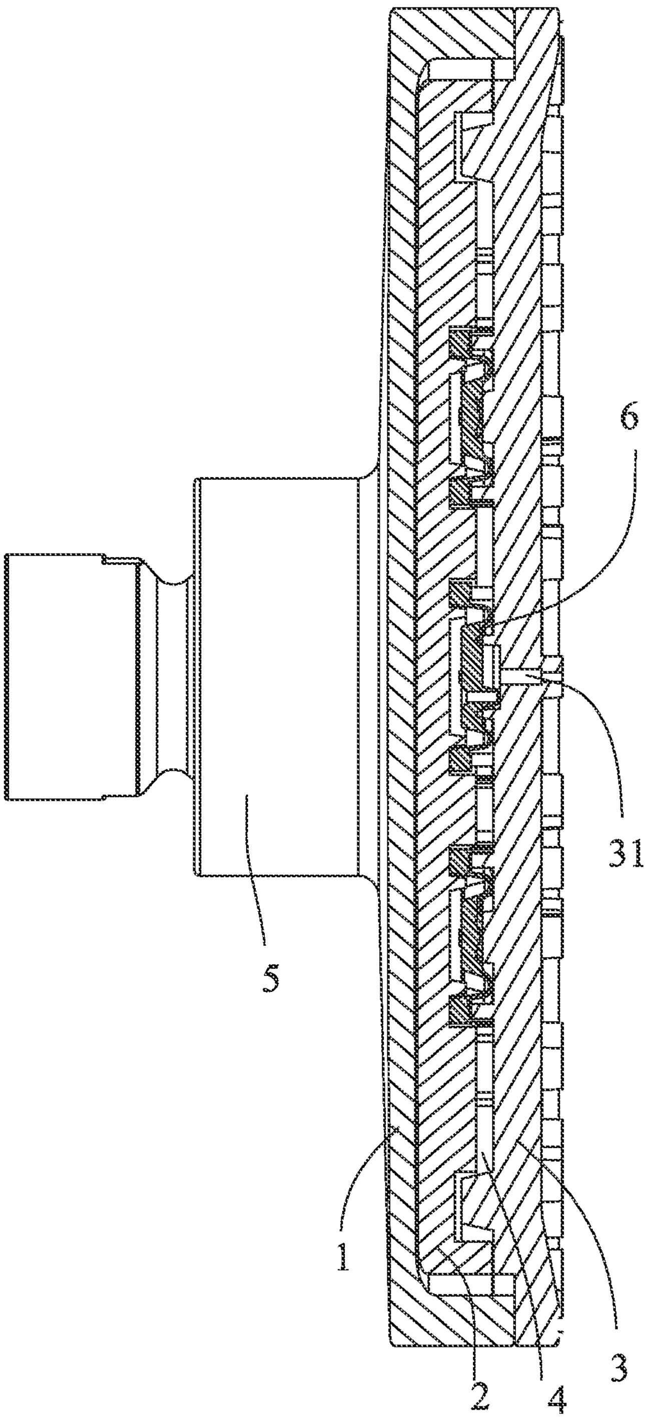
FIG. 2 illustrates a sectional view of the water outlet device in the preferred embodiment in the present disclosure.
Figure 3:
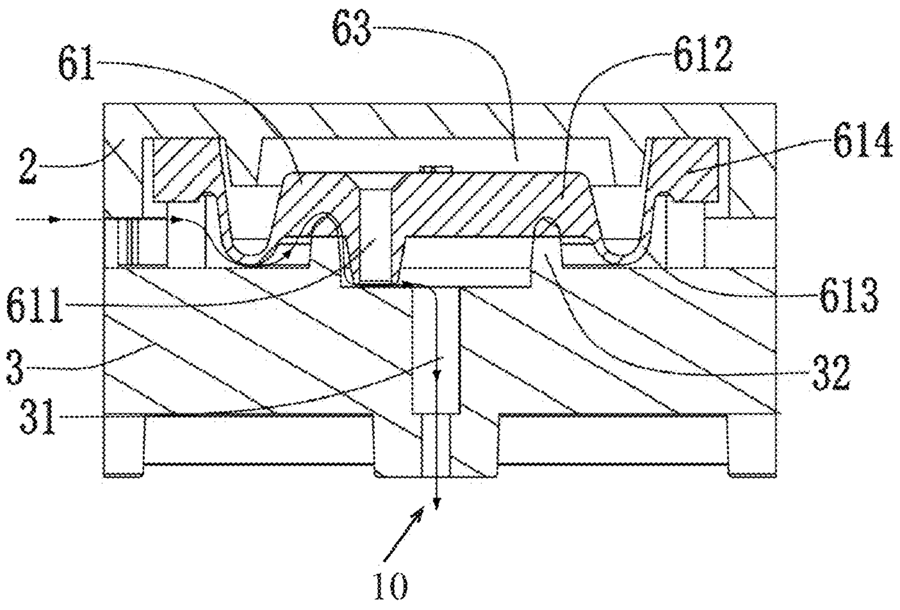
FIG. 3 illustrates an enlarged view of a portion of FIG. 2.
Figure 4:
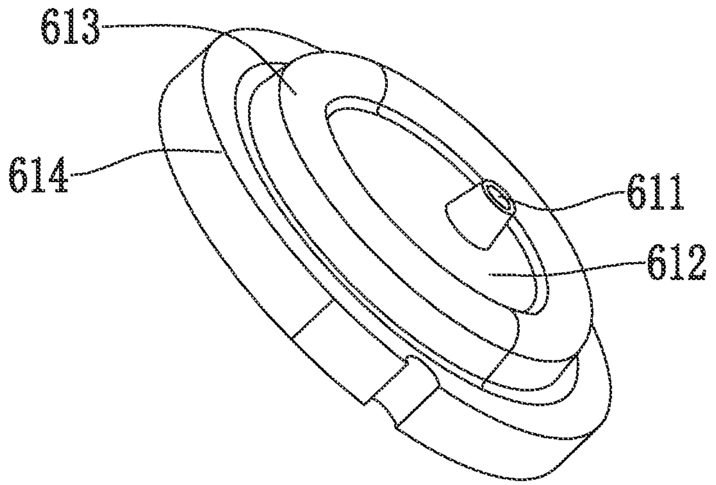
FIG. 4 illustrates a perspective view of a single pad member in the preferred embodiment in the present disclosure.
Figure 5:
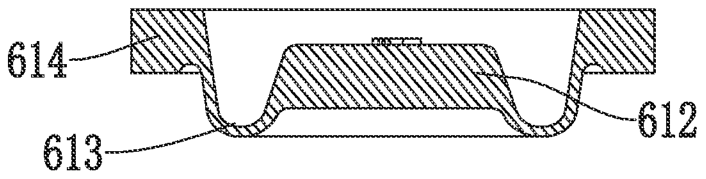
FIG. 5 illustrates a sectional view of the single pad member in the preferred embodiment in the present disclosure.
Figure 6:
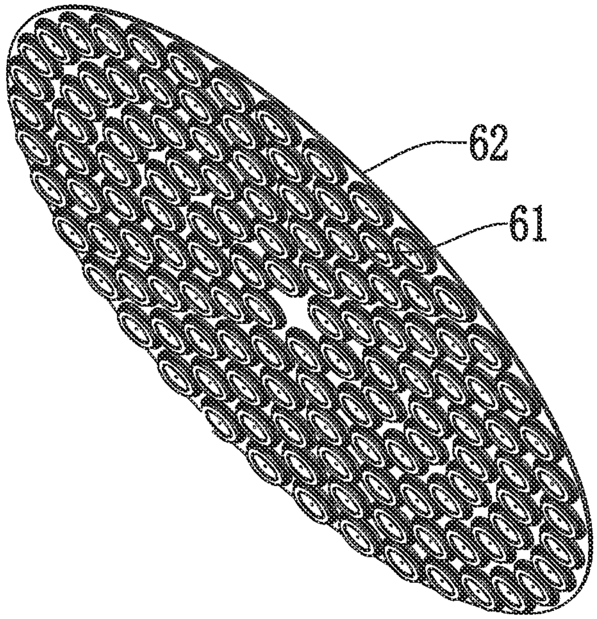
FIG. 6 illustrates a perspective view of a plurality of pad members connected together to define an integrated member by a connecting member in the preferred embodiment in the present disclosure.

The present disclosure will be further described below in combination with the accompanying drawings and embodiments.

Referring to FIGS. 1 to 6, a water outlet device, such as a handheld shower or an overhead shower, is provided. In this embodiment, the water outlet device is the overhead shower, and the water outlet device has a disk shape as a whole and comprises an upper shell 1, a water diverter 2, and a lower panel 3. The upper shell 1 and the lower panel 3 are connected together by covering to define an inner space, and the water diverter 2 is disposed in the inner space. A water outlet chamber 4 is defined between the water diverter 2 and the lower panel 3. The water outlet device further comprises a water inlet joint 5, and the water inlet joint 5 is connected to the upper shell 1 and is in communication with the water outlet chamber 4. The water inlet joint 5 is configured to be in communication with an outer water source and the water inlet joint 5 enables the outer water source to be in communication with the water outlet chamber 4. The lower panel 3 comprises a plurality of water outlet ports 31, and a water outlet direction of the plurality of water outlet ports 31 extends along a direction away from the upper shell 1. The plurality of water outlet ports 31 are uniformly arranged on the lower panel 3.

The water outlet device comprises a water stopping mechanism 6 disposed in the water outlet chamber 4, and the water stopping mechanism 6 comprises one or more pad members 61 configured for elastic deformation. Specifically, the water stopping mechanism 6 comprises a plurality of pad members 61. The number of the one or more pad members 61 is the same as the number of one or more water outlet ports 31 of the plurality of water outlet ports 31, and the plurality of pad members 61 correspond to the plurality of water outlet ports 31 in a one-to-one correspondence. Alternatively, the number of the one or more pad members 61 is different from the number of the one or more water outlet ports 31, and the one or more pad members 61 correspond to some of the plurality of water outlet ports 31 which easily leak water when the water is shut off. Alternatively, one of the one or more pad members 61 corresponds to an outer peripheral of the plurality of water outlet ports 31 so as to hermetically seal the plurality of water outlet ports 31.

The one or more pad members 61 are integrally formed by elastic materials such as silicone, rubber, and the like. The plurality of pad members 61 are connected together by a same connecting member 62 to form a disk-shaped member. The disk-shaped member is clamped between the water diverter 2 and the lower panel 3. Alternatively, the one or more pad members 61 can be independently clamped between the water diverter 2 and the lower panel 3. Alternatively, the one or more pad members 61 can be divided into multiple groups, and each group of the one or more pad members 61 can be connected together by a connecting member 62 to define an integrated member.

The one or more pad members 61 are movably disposed in the water outlet chamber 4 of the water outlet device, and the one or more pad members 61 at least defines a position-providing space 63. The one or more pad members 61 comprise a water stopping position and an open position. When in the water stopping position, the one or more pad members 61 elastically abut an outer peripheral of the one or more water outlet ports 31 of the water outlet chamber 4 to achieve water stopping and hermetical sealing. The one or more pad members 61 move toward the position-providing space 63 due to increasing of water pressure in the water outlet chamber 4 to terminate the water stopping and the hermetical sealing so as to move from the water stopping position to the open position, and the one or more pad members 61 elastically deform to accumulate an elastic force.

When in the water stopping position, the water outlet chamber 4 is not supplied with water, and the one or more pad members 61 elastically abut the outer peripheral of the one or more water outlet ports 31 to achieve the water stopping and the hermetical sealing. When the water outlet chamber 4 is supplied with the water, at this time, the one or more pad members 61 are driven by the water pressure to move toward the position-providing space 63 to move from the water stopping position to the open position due to terminating the water stopping and the hermetical sealing. At this time, the one or more pad members 61 elastically deform to accumulate the elastic force. When supplying of the water to the water outlet chamber 4 is stopped, the elastic force accumulated in the one or more pad members 61 springs back to enable the one or more pad members 61 to hermetically seal and abut the outer peripheral of the one or more water outlet ports 31 again. The one or more pad members 61 are configured for automatic feedback according to a change of the water pressure so as to close the one or more water outlet ports 31 to prevent the water from leaking from the one or more water outlet ports 31 when supplying of the water is stopped.

Figure 7:
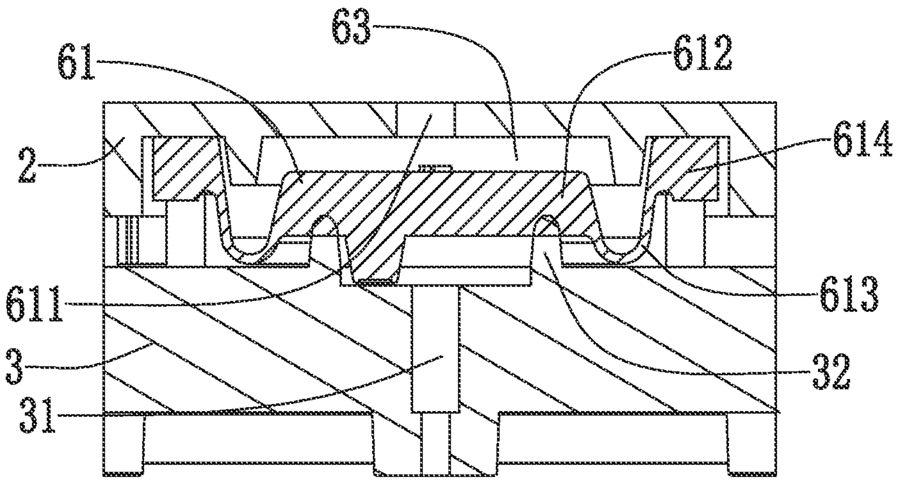
FIG. 7 illustrates a sectional view of a water outlet device in other embodiments in the present disclosure.
Figure 8:
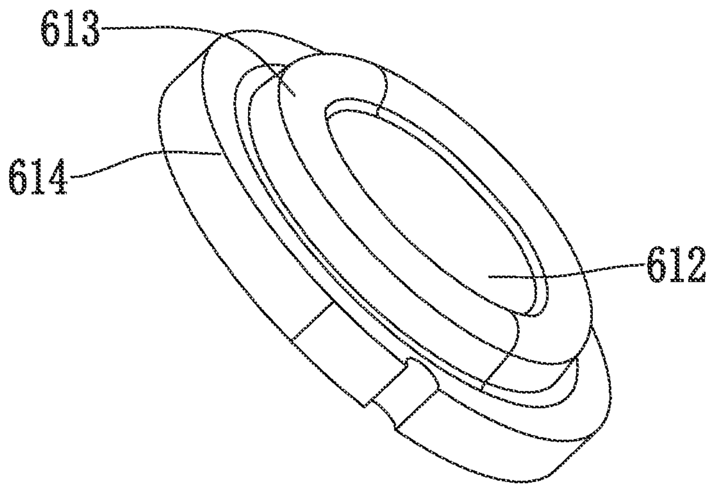
FIG. 8 illustrates a perspective view of a single pad member in other embodiments in the present disclosure.

The water stopping mechanism 6 further comprises one or more ventilation holes 611, and the one or more ventilation holes 611 are in communication with the position-providing space 63 and outside air. When the one or more pad members 61 move toward the position-providing space 63, the one or more ventilation holes 611 are configured to maintain an air pressure balance between the position-providing space 63 and the outside air to avoid the one or more pad members 61 having moving difficulty due to an excessive air pressure generated in the position-providing space 63. More specifically, because the one or more water outlet ports 31 are in communication with the outside air, in this embodiment, the one or more ventilation holes 611 are located on the one or more pad members 61 to be in communication with the one or more water outlet ports 31. Referring to FIGS. 7 and 8, in other embodiments, the one or more ventilation holes 611 are located on the water diverter 2, and the one or more ventilation holes 611 are directly in communication with the outside air.

The one or more pad members 61 comprises a pad body 612 and a deformation member 613 which are integrated to each other, and the deformation member 613 is configured for elastic deformation. The pad body 612 is configured to hermetically seal and abut the outer peripheral of the one or more water outlet ports 31, and the deformation member 613 is configured to apply the elastic force to the pad body 612 toward the one or more water outlet ports 31. The pad body 612 is circle-disk-shaped, a periphery of the pad body 612 is enclosed by the deformation member 613, and a section of a side of the deformation member 613 adjacent to the pad body 612 is U-shaped. The pad body 612 is configured to move through the deformation member 613, and the deformation member 613 is configured to apply a corresponding elastic force to the pad body 612. When the pad body 612 is in the water stopping position, a hermetical sealing connection between the pad body 612 and the one or more water outlet ports 31 is more stable. When the pad body 612 is in the open position, the elastic force is accumulated to enable the pad body 612 to be configured to be reset to the water stopping position once the water pressure is stopped, and a water stopping process is fast and convenient. More specifically, a first side of the pad body 612, the water outlet chamber 4, and the deformation member 613 define the position-providing space 63, and a second side of the pad body 612 is configured to hermetically seal and abut the outer peripheral of the one or more water outlet ports 31. The outer peripheral of the one or more water outlet ports 31 comprises an annular surrounding wall 32, and the pad body 612 hermetically seals and abuts an upper side of the annular surrounding wall 32. Specifically, the pad body 612 hermetically seals and abuts an upper edge of the annular surrounding wall 32 to achieve the water stopping and the hermetical sealing.

For an example in which a single pad member 61 is connected to the water outlet device, the single pad member 61 further comprises a connecting block 614. The deformation member 613 is connected to and disposed between the pad body 612 and the connecting block 614, and the connecting block 614 is configured to be fixedly connected to the water outlet device.

While in use, when the water is not supplied to the water outlet chamber 4, the deformation member 613 drives the pad body 612 to elastically hermetically seal and abut the upper edge of the annular surrounding wall 32 to achieve the water stopping of the one or more water outlet ports 31. When the water is supplied to the water outlet chamber 4, at least some of the water flows out of a flow passage 10 between the one or more pad members 61 and the outer peripheral of the one or more water outlet ports 31 of the lower panel 3, and the pad body 612 moves toward the position-providing space 63 due to increasing of the water pressure in the water outlet chamber 4. At this time, a connection of the hermetical sealing and the water stopping between the pad body 612 and the annular surrounding wall is terminated, and the water flow can flow into the one or more water outlet ports 31 from the upper edge of the annular surrounding wall 32. Meanwhile, the deformation member 613 accumulates the elastic force. During this process, the one or more ventilation holes 611 have a function of balancing the air pressure between the position-providing space 63 and the outside air. When the water supply is stopped, the elastic force accumulated in the deformation member 613 is released to drive the pad body 612 to hermetically seal and abut the upper edge of the annular surrounding wall 32 again to achieve the hermetical sealing and the water stopping again.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A water stopping mechanism configured for a water outlet device, comprising:

one or more pad members configured for an elastic deformation, wherein:

the one or more pad members are configured to be movably disposed in a water outlet chamber of the water outlet device, the one or more pad members at least define a position-providing space, the one or more pad members comprise a water stopping position and an open position, each of the one or more pad members comprises a pad body, and when in the water stopping position:

the pad body of each of the one or more pad members elastically hermetically seals and abuts an outer peripheral wall of a corresponding one of one or more water outlet ports of the water outlet chamber to achieve water stopping and hermetical sealing, and when water flows out of the water stopping mechanism:

at least some of the water flows out of a flow passage between the pad body of each of the one or more pad members and the outer peripheral wall of the corresponding one of the one or more water outlet ports of the water outlet chamber, the one or more pad members are configured to move toward the position-providing space due to increasing of water pressure in the water outlet chamber to terminate the water stopping and the hermetical sealing so as to move from the water stopping position to the open position, and the one or more pad members elastically deform to accumulate an elastic force.

2. The water stopping mechanism configured for the water outlet device according to claim 1, wherein:

the water stopping mechanism further comprises one or more ventilation holes, the one or more ventilation holes are in communication with the position-providing space and outside air, and when the one or more pad members move toward the position-providing space, the one or more ventilation holes are configured to maintain an air pressure balance between the position-providing space and the outside air.

3. The water stopping mechanism configured for the water outlet device according to claim 2, wherein:

the one or more ventilation holes are in communication with the one or more water outlet ports.

4. The water stopping mechanism configured for the water outlet device according to claim 1, wherein:

each of the one or more pad members comprises a deformation member which is integrated with the pad body, the deformation member is configured for the elastic deformation, the pad body is configured to hermetically seal and abut the outer peripheral wall of the corresponding one of the one or more water outlet ports, and the deformation member is configured to apply the elastic force to the pad body toward the corresponding one of the one or more water outlet ports.

5. The water stopping mechanism configured for the water outlet device according to claim 4, wherein:

a periphery of the pad body is enclosed by the deformation member, a first side of the pad body, the water outlet chamber, and the deformation member define the position-providing space, and a second side of the pad body is configured to hermetically seal and abut the outer peripheral wall of the corresponding one of the one or more water outlet ports.

6. The water stopping mechanism configured for the water outlet device according to claim 4, wherein:

the outer peripheral wall of the corresponding one of the one or more water outlet ports comprises an annular surrounding wall, and the pad body is configured to hermetically seal and abut an upper side of the annular surrounding wall.

7. The water stopping mechanism configured for the water outlet device according to claim 1, wherein:

the one or more pad members are a plurality of pad members, and the plurality of pad members respectively correspond to a plurality of water outlet ports of the one or more water outlet ports.

8. The water stopping mechanism configured for the water outlet device according to claim 7, wherein:

the water stopping mechanism further comprises a connecting member, which is connected to and disposed between the plurality of pad members, and the connecting member is configured to be connected to the water outlet device.

9. The water stopping mechanism configured for the water outlet device according to claim 4, wherein:

each of the one or more pad members comprises a connecting block, the deformation member is connected to and disposed between the pad body and the connecting block, and the connecting block is configured to be fixedly connected to the water outlet device.

10. A water outlet device comprising the water stopping mechanism configured for the water outlet device according to claim 1.

11. The water stopping mechanism configured for the water outlet device according to claim 5, wherein:

each of the one or more pad members comprises a connecting block, the deformation member is connected to and disposed between the pad body and the connecting block, and the connecting block is configured to be fixedly connected to the water outlet device.

12. The water stopping mechanism configured for the water outlet device according to claim 6, wherein:

each of the one or more pad members comprises a connecting block, the deformation member is connected to and disposed between the pad body and the connecting block, and the connecting block is configured to be fixedly connected to the water outlet device.

13. The water stopping mechanism configured for the water outlet device according to claim 7, wherein:

the water stopping mechanism further comprises one or more ventilation holes, the one or more ventilation holes are in communication with the position-providing space and outside air, and when the one or more pad members move toward the position-providing space, the one or more ventilation holes are configured to maintain an air pressure balance between the position-providing space and the outside air.

14. The water stopping mechanism configured for the water outlet device according to claim 13, wherein:

the one or more ventilation holes are in communication with the one or more water outlet ports.

15. The water stopping mechanism configured for the water outlet device according to claim 7, wherein:

each of the plurality of pad members comprises a deformation member which is integrated with the pad body, the deformation member is configured for the elastic deformation, the pad body is configured to hermetically seal and abut the outer peripheral wall of the corresponding one of the plurality of water outlet ports, and the deformation member is configured to apply the elastic force to the pad body toward the corresponding one of the plurality of water outlet ports.

16. The water stopping mechanism configured for the water outlet device according to claim 15, wherein:

a periphery of the pad body is enclosed by the deformation member, a first side of the pad body, the water outlet chamber, and the deformation member define the position-providing space, and a second side of the pad body is configured to hermetically seal and abut the outer peripheral wall of the corresponding one of the plurality of water outlet ports.

17. The water stopping mechanism configured for the water outlet device according to claim 15, wherein:

the outer peripheral wall of the corresponding one of the plurality of water outlet ports comprises an annular surrounding wall, and the pad body is configured to hermetically seal and abut an upper side of the annular surrounding wall.

* * * * *